Figure 1:
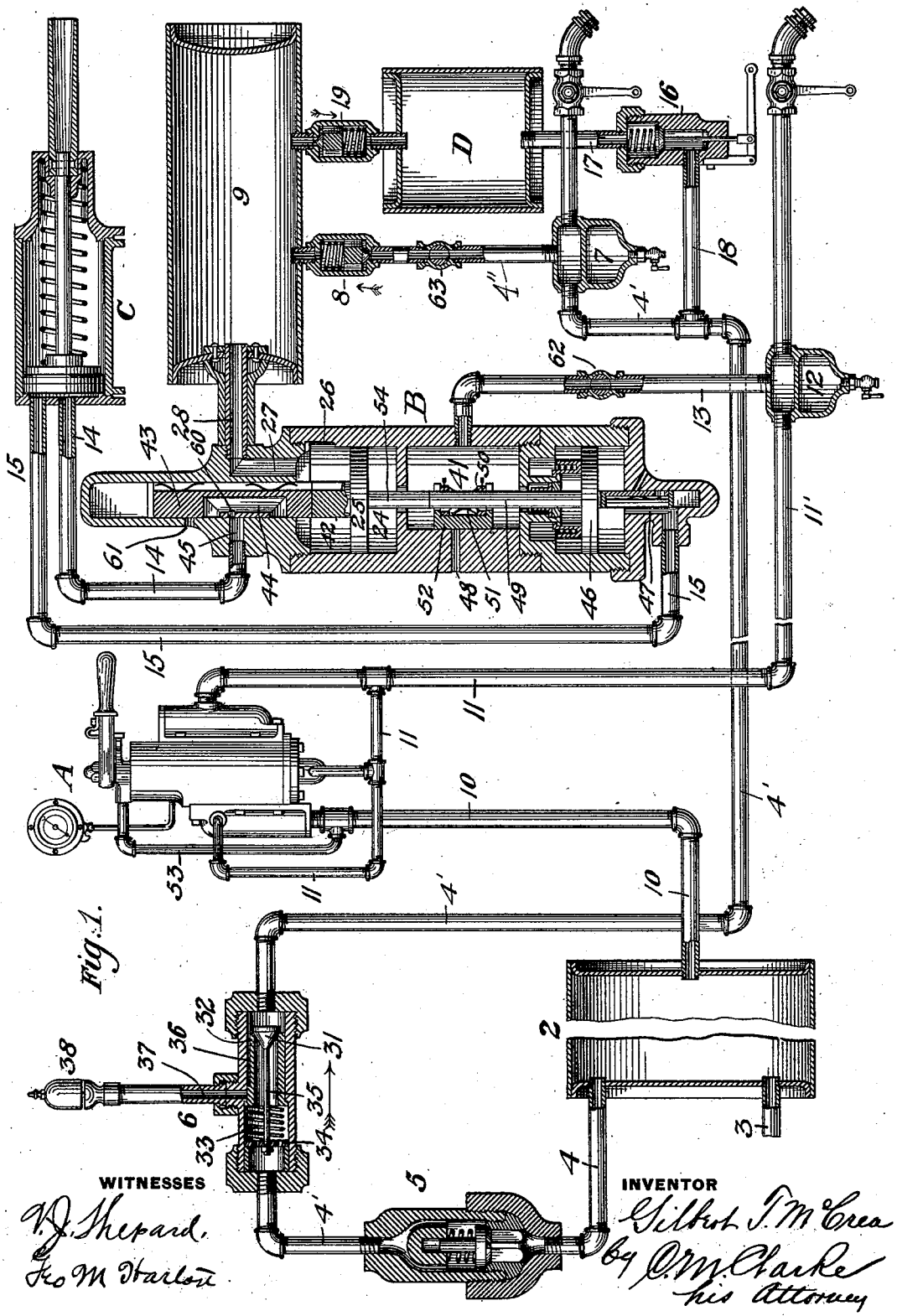

(No Model.)  4 Sheets—Sheet 1.

G. T. McCREA.
FLUID PRESSURE AUTOMATIC BRAKE MECHANISM.

No. 549,738. Patented Nov. 12, 1895.

WITNESSES
INVENTOR (No Model.) 4 Sheets—Sheet 2.
G. T. McCREA.
FLUID PRESSURE AUTOMATIC BRAKE MECHANISM.
No. 549,738. Patented Nov. 12, 1895.
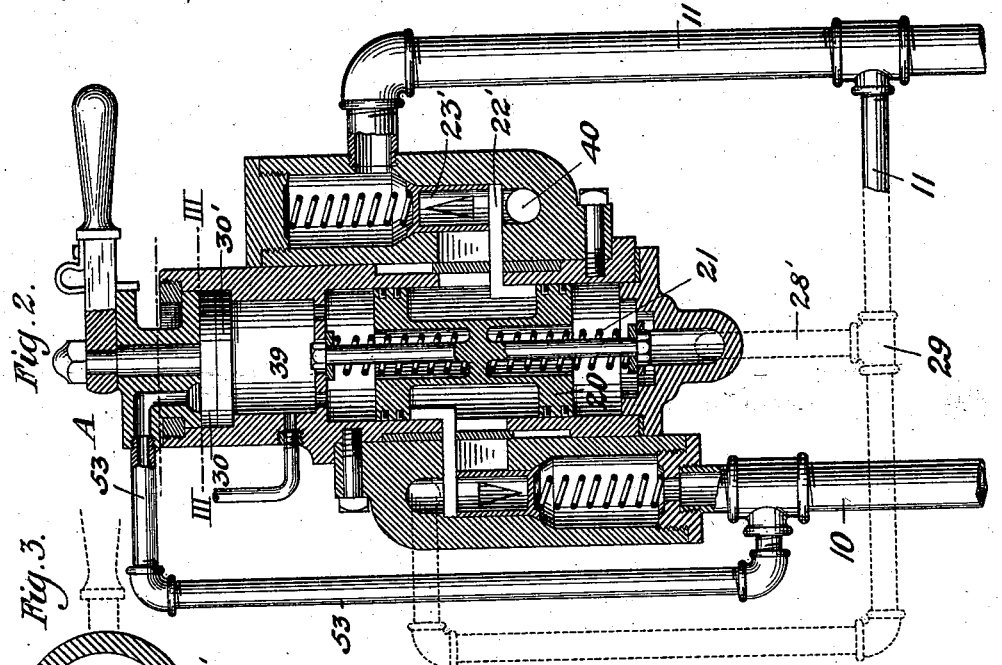
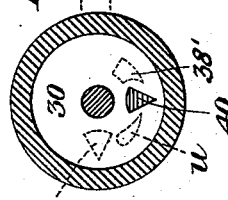
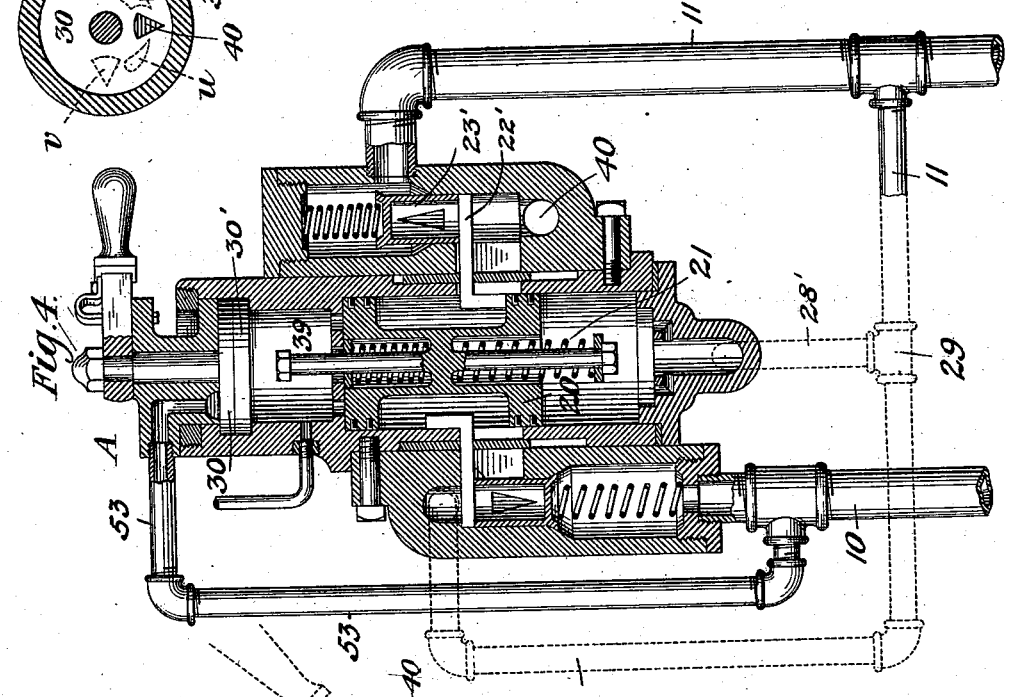
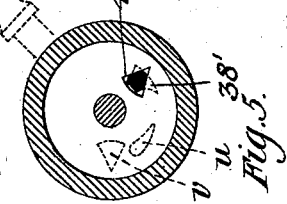
WITNESSES
INVENTOR
Gilbert T. McCrea
by C. M. Clarke
his Attorney (No Model.) 4 Sheets—Sheet 3.
G. T. McCREA.
FLUID PRESSURE AUTOMATIC BRAKE MECHANISM.
No. 549,738. Patented Nov. 12, 1895.
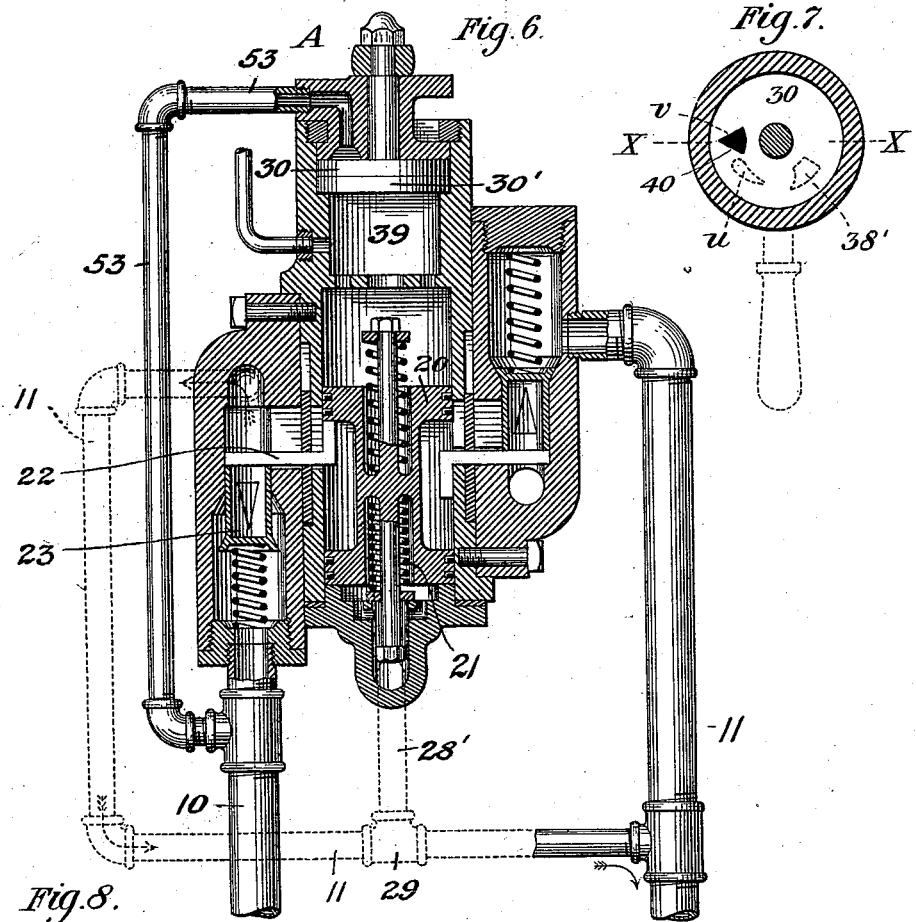
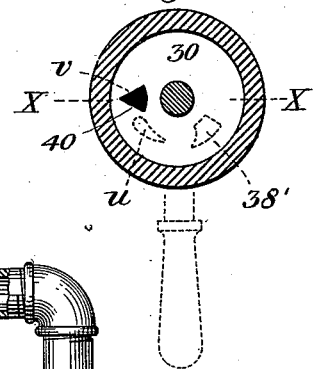
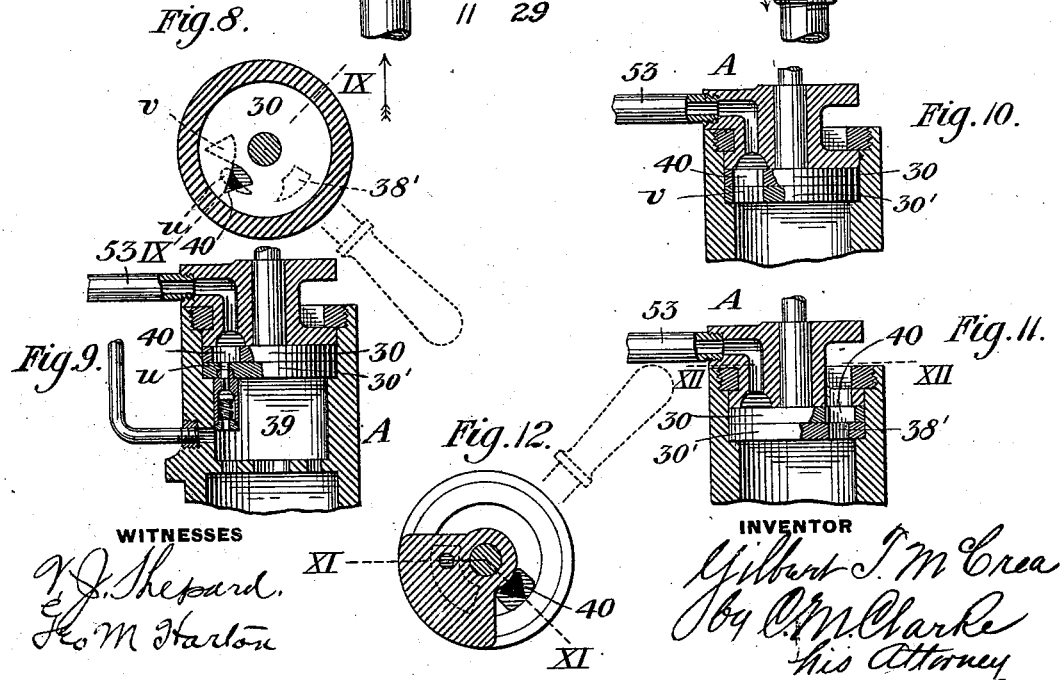
WITNESSES
INVENTOR
ANDREW B.GRAHAM, PHOTO-LITHO, WASHINGTON, D.C.

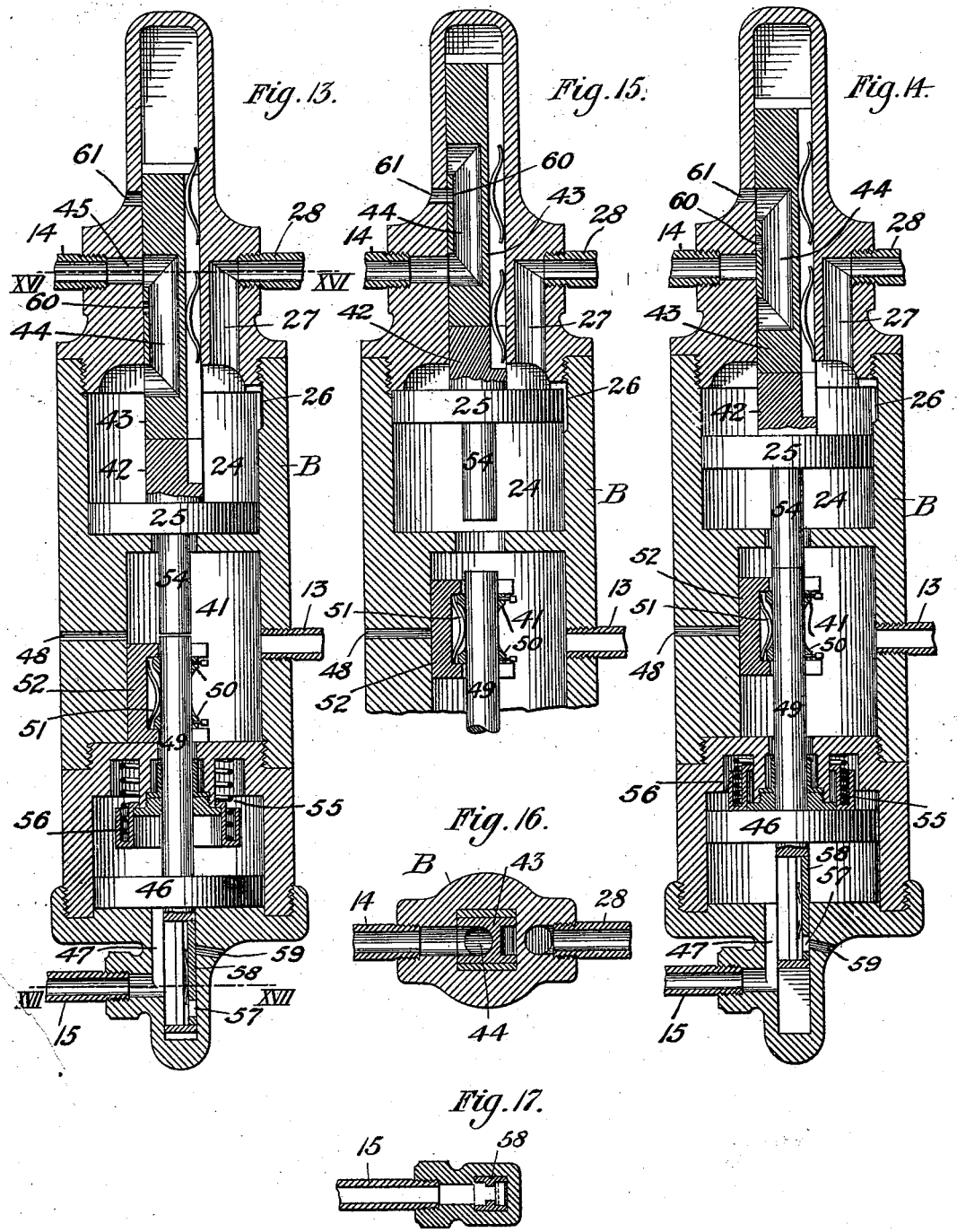

UNITED STATES PATENT OFFICE.

GILBERT T. McCREA, OF BRUSH VALLEY, PENNSYLVANIA.

FLUID-PRESSURE AUTOMATIC BRAKE MECHANISM.

SPECIFICATION forming part of Letters Patent No. 549,738, dated November 12, 1895.

Application filed February 16, 1895. Serial No. 538,736. (No model.)

*To all whom it may concern:*

Be it known that I, GILBERT T. MCCREA, a citizen of the United States, residing at Brush Valley, in the county of Indiana and State of Pennsylvania, have invented or discovered a new and useful Improvement in Fluid-Pressure Automatic Brake Mechanism, of which the following is a full, clear, and exact description.

My invention consists in certain new and improved apparatus for operating air-brakes for railways, comprising the usual main and auxiliary reservoirs, brake-cylinder, and connections therewith, together with an improved engineer's valve, equalizing-valve, intermediate reservoir, and signaling-valve, whereby I am enabled to secure certain advantageous results not heretofore possible by any system of braking apparatus now known to me.

The various objects of my invention are, in general, to charge into the auxiliary reservoir a constant pressure which is continuously maintained and renewed during the process of braking, to utilize the system of signal-pipes to keep a continuous pressure within the auxiliary reservoir and for the purpose of signaling through the engineer's signal by a back-pressure from a reservoir charged to a higher pressure for that purpose, to make a partial reduction in the brake-cylinder without entirely exhausting the air therefrom, to accomplish an independent exhaust from the equalizing-valve on each car instead of employing the train line back to the engineer's valve for that purpose, together with an engineer's signal-valve of improved construction, and certain other novel and valuable features which constitue parts of my system, as shall be more fully hereinafter set forth.

Referring now to the drawings, Figure 1 is a diagrammatic view illustrating the general arrangement of the various reservoirs, pipes, valves, cylinders, &c., comprised in my system. Fig. 2 is an enlarged sectional view of the engineer's valve. Fig. 3 is a cross-sectional view taken on the line III III of Fig. 2, showing the regulating-disk of the engineer's valve in a normal or inoperative position as assumed in Fig. 2. Fig. 4 is a similar view to Fig. 2, but illustrating the piston of the engineer's valve in a raised position, due to a release of pressure through the exhaust-opening in the lower disk. Fig. 5 is a view similar to Fig. 3, showing the regulating-disk in register with the exhaust-opening as assumed in Fig. 4. Fig. 6 is a similar view to Fig. 2, showing the piston of the engineer's valve in a lowered position establishing a circulation from the main reservoir to the train-pipe. Fig. 7 is another diagrammatic view showing the disk in position as assumed in Fig. 6. Fig. 8 is a similar diagrammatic view illustrating a different position of the disk, so as to register with the reducing-valve. Fig. 9 is a cross-sectional view taken on the line IX IX of Fig. 8. Fig. 10 is a similar cross-sectional view taken on the line X X of Fig. 7. Fig. 11 is a similar cross-sectional view taken on the line XI XI of Fig. 12. Fig. 12 is a cross-sectional view taken on the line XII XII of Fig. 2. Fig. 13 is a vertical sectional view of the equalizing-valve, showing a circulation from the auxiliary reservoir to the brake-cylinder. Fig. 14 is a similar view to Fig. 13, but illustrating the operative parts of the valve in a different position, showing the method of partially releasing pressure from the brake-cylinder. Fig. 15 is a partial vertical section similar to Figs. 13 and 14, showing the manner of giving a full release from the brake-cylinder. Fig. 16 is a cross-sectional view taken on the line XVI XVI of Fig. 13. Fig. 17 is a cross-sectional view taken on the line XVII XVII of Fig 13.

Like symbols of reference refer to like parts wherever used throughout this specification.

Referring generally to the drawings, 2 is the usual main reservoir in communication by pipe 3 with an air-compressor. A line of pipe 4 leads from the main reservoir to a reducing-valve 5, situated between the main reservoir and the engineer's equalizing signal-valve 6. This reducing-valve is provided with a spring-controlled valve capable of exerting a resistance of twenty pounds, so that if an initial pressure of, say, ninety pounds exists in the main reservoir the pressure in the pipe 4', upon entering the engineer's equalizing signal-valve, will be reduced to seventy pounds, thus establishing a normal pressure of seventy pounds in the signal-pipe, designated by the numeral 4', which pressure will be maintained throughout its length. In communication with the signal-pipe 4', leading from an interposed drip-chamber 7, is a branch pipe 4'', communicating through a check-valve 8 with the auxiliary reservoir 9, thus furnishing a constant supply of pressure therein at, say, seventy pounds.

A is the engineer's valve in communication with the main reservoir by pipe 10, and leading therefrom is the train-pipe 11, supplied with the usual drip-chamber 12. The engineer's valve will be hereinafter more fully described, as illustrated by the subsequent figures in detail. A pipe 13 communicates from the train-pipe with an equalizing-valve B, the purpose and functions of which will also be more particularly described hereinafter.

C is the brake-cylinder, between which and the equalizing-valve communicate the supply and exhaust pipes 14 and 15, respectively.

D is a small reservoir interposed between the auxiliary reservoir and the conductor's valve 16, to which it is connected by pipe 17, a branch pipe 18 communicating with the signal-pipe 4', thereby establishing communication between reservoir D and engineer's equalizing signal-valve 6. Interposed between the auxiliary reservoir 9 and reservoir D is the check-valve 19, allowing a passage of air from the auxiliary reservoir to reservoir D, but preventing its return should the pressure in the auxiliary reservoir be reduced. The valves 8 and 19 are provided with very light spiral springs of sufficient strength only to keep the valve in its seat. A pressure in excess of seventy pounds, therefore, having been established in reservoir D, by raising the lever in the conductor's valve pressure will flow back through pipes 18 and 4' to the engineer's signal.

I shall now describe the operation of increasing the pressure in the auxiliary reservoir and reservoir D over the pressure in the signal line 4'.

Referring to Fig. 6, the engineer's valve is turned so as to admit the full pressure of ninety pounds on top of the piston 20, when it will be forced down, compressing the spring 21, which has a resisting strength of, say, ten pounds. In its downward travel the piston will engage the arm 22, mounted in the casing of the valve, which arm will depress the valve 23, allowing air to flow from the main reservoir through valve 23, around through train-pipes 11, drip-chamber 12, branch pipe 13, and into equalizing-valve B. By reason of the resistance of ten pounds in the spring 21 the initial pressure of ninety pounds in the main reservoir will now have been reduced to eighty pounds, and upon admission of air, as described, into chamber 24 of equalizing-valve B the piston 25 will be raised into the position shown in Fig. 15, establishing communication through the small groove 26, port 27, pipe 28 to the auxiliary reservoir 9. It will be readily seen that the same pressure which is thus established in the auxiliary reservoir will communicate through the check-valve 19 to the small reservoir D and establish therein a pressure of eighty pounds. A back-pressure through the branch pipe 28', connected with train-pipe 11 at 29, acting in conjunction with spring 21, will then serve to restore the piston 20 to the normal position shown in Fig. 2, allowing the valve 23 to reseat itself under action of the spring and cutting off communication from main reservoir 2. Having thus established a pressure of eighty pounds in the reservoir D, and, as already described, the pressure in the signal-pipe 4', serving as an auxiliary charging line, having been established at seventy pounds, I have thus an excess pressure in reservoir D of ten pounds. By raising the lever of the conductor's valve 16 this excess pressure will flow back through the connecting-pipe 18 into the line 4' and to the engineer's equalizing signal-valve 6. This valve is designed to allow a free circulation of air in the direction of the arrow from the main reservoir to the auxiliary reservoir, lifting the valve 31 from its seat in the bushing 32, depressing the spring 33, against which perforated diaphragm 34 and the nut on stem 35 will act. This spring acting on the valve 31 will hold it to its seat until, under application of pressure to the brakes, pressure in the auxiliary reservoir has been reduced below seventy pounds, allowing pressure back of the valve 31 to open it and supply pressure until the pressure on both sides is equalized, thereby re-establishing a pressure of seventy pounds in the auxiliary reservoir.

The operation of signaling is accomplished by means of the excess pressure from reservoir D, due to opening conductor's valve acting on valve 31 and bushing 32, forcing them back until the groove 36 in the bushing 32 is brought into register with the port 37, leading to the whistle 38, when the air may blow through the whistle as long as the conductor's valve is kept open and until the excess pressure in reservoir D is exhausted.

I shall now describe the operation of making an application of the brakes.

Referring to Figs. 4 and 5, the disk 30 in the engineer's valve is turned into register, as shown, with the exhaust-passage 38' until an amount has escaped from the chamber 39 equal to the breaking-pressure desired in the brake-cylinder. This allows the piston 20 to rise into the position shown in Fig. 4, raising the valve 23' by means of arm 22'', unseating the valve, and allowing air to escape back through pipe 13, train-pipes 11' and 11, through port 40 to the atmosphere. This will result in a reduction of pressure in chamber 41 in the equalizing-valve B, causing the pressure in the auxiliary reservoir to act on piston 25, depressing it into the position shown in Fig. 13, carrying down with it the stem 42, carrying the valve 43, supplied with port 44, which is thus brought into register with port 45 in the casing of the valve B, from which the supply-pipe 14 leads to the brake-cylinder.

The pipe 28 leading from the auxiliary reservoir is then in communication with the open port 45, and a circulation will then be established from the auxiliary reservoir direct to the brake-cylinder and throughout the return-pipe 15, leading to the bottom of the valve B, where it communicates directly under the piston 46 through a port 47. It will thus be seen that whatever amount of pressure is admitted to the brake-cylinder will exert an equal pressure under the piston 46, which will restore the piston 46 to its original position, as shown in Fig. 1. This is due to the fact that whatever reduction of pressure is made in the chamber 41 will result in an admission of air from the auxiliary reservoir to the brake-cylinder and finally underneath piston 46 in an equal amount, overcoming the pressure on top of piston 25 and restoring the pistons 46 and 25 to their original position. A spiral spring 55, seated in a case 56, will interpose a cushioning resistance to the upward travel of the piston 46, thus limiting its upward travel until the under stem 54 of the valve 25 has been raised into the position shown in Fig. 14, due to an increase of pressure in chamber 41, when it is desired to make a partial release of the brake-cylinder, as hereinafter described. Thus if there is a pressure of eighty pounds in chamber 41 and this pressure is reduced ten pounds through the engineer's valve the piston 25 will fall, uncovering the port 44 and allowing a flow of air from the auxiliary reservoir to the brake-cylinder, which flow will also pass down, as described, under piston 46, when the amount of reduction will be overcome and the piston 46 will rise, carrying with it piston 25 and stem 42 whenever the pressure from the auxiliary reservoir has exceeded the amount of reduction sufficiently, so that such pressure, in addition to the pressure still remaining in the chamber 41, will operate to raise the piston and cut off the supply of air from the auxiliary reservoir. This operation may be repeated as long as there is any pressure remaining in the chamber 41 and train-pipe 11.

For the purpose of facilitating the exhaust from chamber 41 I have provided the small port 48, opening into the atmosphere, by means of which I am enabled to make a quicker reduction of pressure than if the reduction was made back through the train-pipe to the engineer's valve, which, in the case of a long train, would result in an appreciable delay. Mounted on the stem 49 of the piston 46, supported by vertically-adjustable collars 50 and held against the inner face of the chamber 41 by spring 51, is the sliding valve 52, so arranged as to uncover the port 48 when a reduction of pressure is made in the chamber and to slide over and keep it covered in all other positions of the valve. The port 48 is open only when the piston 46 is in the lowest position, and then only until the flow of air from the auxiliary reservoir has again equalized the pressure in the equalizing-valve B.

In the present system of braking apparatus, when it is desired to release the brakes it is necessary to allow all pressure to escape from the brake-cylinder before recharging, when the desired pressure may then be applied. In practice it is frequently desirable to make a partial release of the brakes by reducing the pressure in the brake-cylinder gradually, and this I am enabled to do in the following manner: When it is desired to release the pressure in the brake-cylinder, the disk 30 of the engineer's valve is brought into register with the opening $u$ or $v$ in the lower stationary disk 30', when air will flow from the main reservoir by pipes 10 and 53 through the ports in register and upon the piston 20, depressing it into the position shown in Fig. 6, as already described heretofore, in the operation of increasing the pressure in the auxiliary reservoir. This will allow a flow of air from the main reservoir through the engineer's valve, train-pipe 11, and pipe 13, causing an increase in pressure in chamber 24, under piston 25 in the equalizing-valve, equal to the desired reduction in the brake-cylinder. Thus if it is desired to reduce the pressure in the brake-cylinder five pounds, an increase in the pressure in chamber 41 of five pounds will cause such excess to raise the piston 25 until the piston 46 will assume the position shown in Fig. 14, its stem 49 abutting against the stem 54. In this position the port 57 in the sliding valve 58, located in the lower end of the stem 49, will be brought into register with the port 59 in the bottom of equalizing valve-case B, opening into the atmosphere. This will allow the air to flow back from the brake-cylinder through pipe 15 and from under the piston 46 until the pressure has been reduced by an amount equal to the increase in pressure in chamber 41, allowing the spring 55 to act upon the piston 46 in unison with the pressure on top of piston 25 from the auxiliary reservoir, thus allowing the pistons 25 and 46 to drop until the spring 55 has expanded, when the port 59 will be closed again and assume the position shown in Fig. 1.

To accomplish a full release of pressure from the brake-cylinder, an increase of pressure over and above the pressure in the auxiliary reservoir is admitted into chamber 41, when the piston 25 will be raised into the position shown in Fig. 15, the valve 43 being raised until the port 60 in valve 43 is in register with the opening 61 in the case B. Air will then flow back from the brake-cylinder through pipe 14, port 44, and finally out into the atmosphere, and will continue to flow until entirely exhausted, or as long as the excess pressure is maintained in chamber 41.

Stop-cocks 62 and 63 are interposed in the train-pipe branch 13 and signal-pipe 4', so that in case of any of the parts of the equalizing-valve or brake-cylinder being out of order on any single car it will not interfere with the operation of similar mechanism on any other part of the train.

Changes and modifications may be made in the operation and construction of my apparatus by the skilled mechanic without departing from my invention.

The various pressures mentioned in the foregoing specification may be increased or diminished at will, and I have referred to such by specific amounts simply to illustrate the operation of the various parts, it being evident that such pressures are not arbitrary and that the apparatus will operate equally well at other pressures, the same relative proportions being maintained.

The several parts of the apparatus are simple and strong and not likely to get out of order, and, generally, my apparatus possesses numerous and valuable advantages in construction and operation over other systems of braking apparatus at present employed.

In describing the system which comprises the subject-matter of my present application I have found it necessary to include therein a brief description of the engineer's valve, equalizing-valve, engineer's equalizing signal-valve, and such other parts of the apparatus which are necessary to its operation as a whole and complete system.

Having described my invention and in what manner it operates, what I claim, and desire to secure by Letters Patent, is—

1. In a system of fluid pressure automatic brake mechanism, an engineer's equalizing signal valve, interposed between the main reservoir and the auxiliary reservoir, fitted with a valve arranged to open to supply pressure from the main reservoir to the auxiliary reservoir, whenever the pressure in the auxiliary reservoir is reduced below the pressure in the supply pipe leading to the valve and to close whenever the pressure in the auxiliary reservoir has been restored to a pressure equal to that in the valve, substantially as set forth.

2. In a system of fluid pressure automatic brake mechanism a reducing valve and an engineer's equalizing signal valve interposed between the main reservoir and the auxiliary reservoir, the engineer's equalizing signal valve, being arranged to open to supply a reduced pressure from the main reservoir to the auxiliary reservoir, whenever the pressure in the auxiliary reservoir is reduced below the pressure in the pipe leading from the reducing valve to the signal valve, and to close whenever the pressure in the auxiliary reservoir has been restored to a pressure equal to that in the pipe, substantially as set forth.

3. In a system of fluid pressure automatic brake mechanism having a line of independent signal pipe between the main reservoir and the auxiliary reservoir, an engineer's equalizing signal valve interposed in the signal pipe between the main reservoir and the auxiliary reservoir, whereby a constant pressure is maintained in the auxiliary reservoir, substantially as set forth.

4. In a system of fluid pressure automatic brake mechanism having a line of independent signal pipe between the main reservoir and the auxiliary reservoir, a reducing valve and an engineer's equalizing signal valve interposed in the signal pipe between the main reservoir and the auxiliary reservoir, whereby a constant pressure is maintained in the auxiliary reservoir to an amount equal to the pressure in the main reservoir, less the amount of reduction in the reducing valve substantially as set forth.

5. In a system of fluid pressure automatic brake mechanism, in combination with the main reservoir and a high pressure reservoir D, an engineer's equalizing signal valve inserted in a line of pipe leading from the main reservoir to the high pressure reservoir, said signal valve provided with a spring controlled check valve designed to open under pressure from the main reservoir, and to give circulation through the valve, and a spring controlled bushing, on which the check valve is seated, designed to be operated by back pressure from the reservoir D through a conductor's valve and to bring a port in the bushing into register with a whistle in the signal valve, substantially as set forth.

6. In a system of fluid pressure automatic brake mechanism provided with a main reservoir, a reducing valve, an engineer's equalizing signal valve, an equalizing valve and an auxiliary reservoir; a high pressure reservoir in communication with the equalizing valve through the auxiliary reservoir, capable of being charged to the full pressure in the main reservoir, and also in communication through a conductor's valve with engineer's equalizing signal valve, whereby such valve may be operated by the greater pressure from the high pressure reservoir, upon opening the conductor's valve, substantially as set forth.

7. In a system of fluid pressure automatic brake mechanism, a supply pipe communicating from the main reservoir, through a reducing valve and an engineer's equalizing signal valve to the auxiliary reservoir, the supply pipe being also in communication through a conductor's valve with a high pressure reservoir whereby the greater pressure in the high pressure reservoir may operate through the same pipe to actuate the engineer's equalizing signal valve, substantially as set forth.

8. In a system of fluid pressure automatic brake mechanism, an engineer's discharge valve in communication with an equalizing valve, controlling communication from the auxiliary reservoir to the brake cylinder through a supply pipe, and a return pipe leading to the bottom of the equalizing valve, with means for cutting off the exhaust from the brake cylinder allowing of a partial release therefrom, substantially as set forth.

9. In a system of fluid pressure automatic brake mechanism, in combination with an auxiliary reservoir in communication through an engineer's valve and an equalizing valve with the main reservoir, and an engineer's signal valve also in communication with the main reservoir, the high pressure reservoir D located between the auxiliary reservoir and the signal valve, communicating through a check valve with the auxiliary reservoir and with the signal valve through a conductor's valve, substantially as set forth.

In testimony whereof I have hereunto set my hand this 24th day of December, 1894.

GILBERT T. McCREA.

Witnesses:
J. D. HERN,
C. M. CLARKE.